(12) United States Patent
Marais

(10) Patent No.: US 10,562,634 B2
(45) Date of Patent: Feb. 18, 2020

(54) SLIDING AND PIVOTING TRAY TABLE

(71) Applicant: Safran Seats, Plaisir (FR)

(72) Inventor: Jean-Charles Marais, Sainte Lizaigne (FR)

(73) Assignee: Safran Seats, Plaisir (FR)

( * ) Notice: Subject to any disclaimer, the term of this patent is extended or adjusted under 35 U.S.C. 154(b) by 405 days.

(21) Appl. No.: 15/302,474

(22) PCT Filed: Apr. 7, 2015

(86) PCT No.: PCT/IB2015/052506
§ 371 (c)(1),
(2) Date: Oct. 6, 2016

(87) PCT Pub. No.: WO2015/155682
PCT Pub. Date: Oct. 15, 2015

(65) Prior Publication Data
US 2017/0021932 A1 Jan. 26, 2017

Related U.S. Application Data

(60) Provisional application No. 61/976,056, filed on Apr. 7, 2014.

(51) Int. Cl.
*B64D 11/06* (2006.01)
(52) U.S. Cl.
CPC ................ *B64D 11/0638* (2014.12)
(58) Field of Classification Search
CPC ................................. B64D 11/0638
USPC ......................................... 297/147
See application file for complete search history.

(56) References Cited

U.S. PATENT DOCUMENTS

| 5,547,247 | A | 8/1996 | Dixon |
| 8,020,808 | B2 | 9/2011 | Collins et al. |
| 2003/0188672 | A1 | 10/2003 | Parent et al. |
| 2005/0258672 | A1 | 11/2005 | Schweizer |
| 2010/0319588 | A1 | 12/2010 | Hanna et al. |
| 2012/0167807 | A1 | 7/2012 | Legeay |
| 2013/0093221 | A1 | 4/2013 | Ligonniere et al. |

FOREIGN PATENT DOCUMENTS

| WO | 2008141829 | 11/2008 |
| WO | 2015155682 | 10/2015 |

OTHER PUBLICATIONS

International Patent Application No. PCT/IB2015/052506, Invitation to Pay Additional Search Fee and Partial Search Report dated Jun. 29, 2015.
International Patent Application No. PCT/IB2015/052506, Search Report and Written Opinion dated Nov. 2, 2015.

*Primary Examiner* — Anthony D Barfield
(74) *Attorney, Agent, or Firm* — Kilpatrick Townsend & Stockton LLP; Dean W. Russell; Tiffany L. Williams

(57) ABSTRACT

Described are pivoting and sliding tray tables (10) that move through a substantially constant plane from a stowed position to a deployed position for use with passenger seats. The tray table (10) rides on two elements (14, 18) that themselves ride along guide tracks or guide rails (21, 22, 23) to provide a combination rotating and translating motion during deployment. In the deployed position, the tray table may be displaced linearly but is restricted from rotation. The tray table may be moved to accommodate passengers of differing size or to allow ingress and egress from the passenger seat with a reduced risk of unintentional rotation.

24 Claims, 5 Drawing Sheets

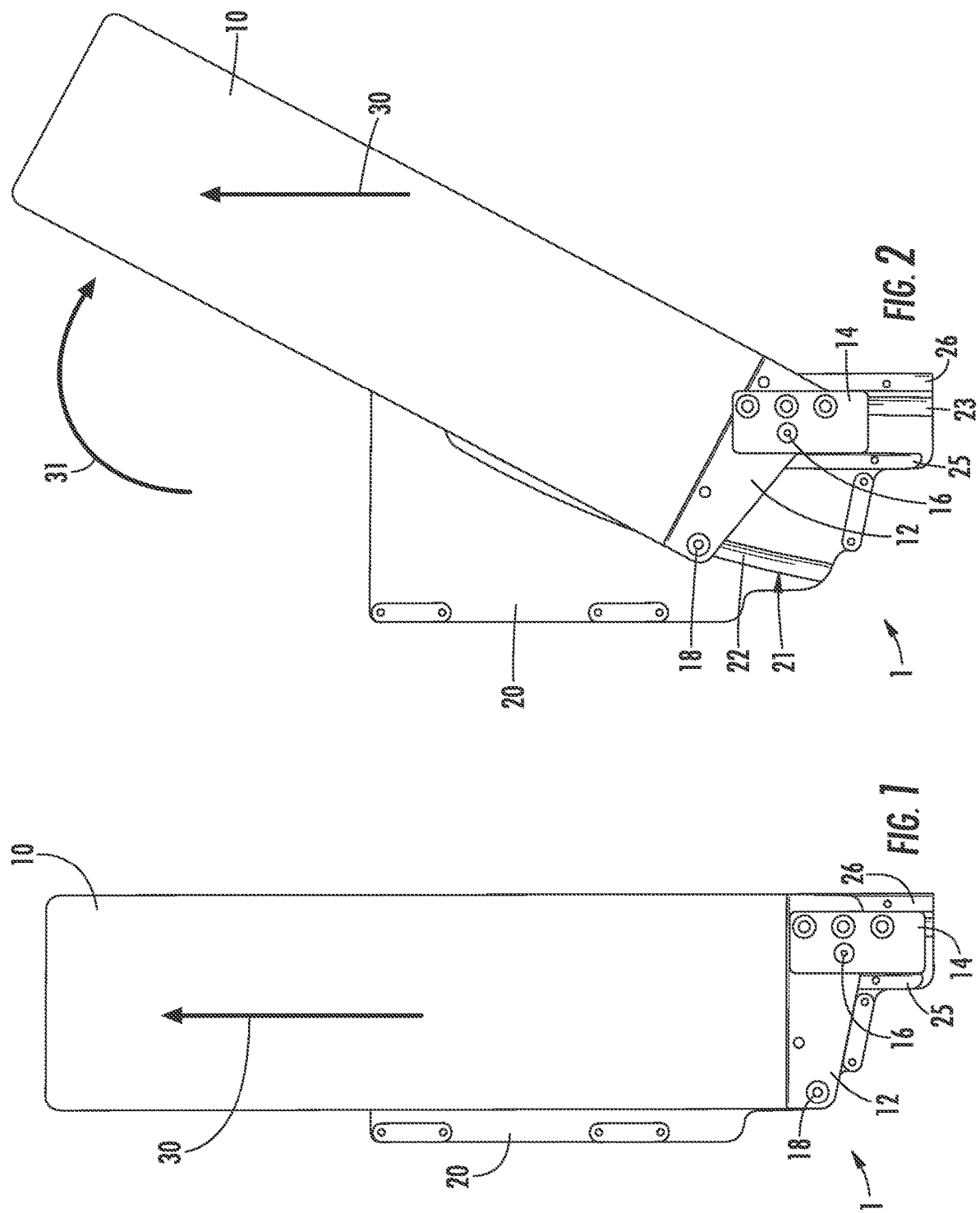

SLIDING AND PIVOTING TRAY TABLE

CROSS REFERENCE TO RELATED APPLICATIONS

This application is the U.S. national phase entry of International Patent Application Ser. No. PCT/IB2015/052506 ("the '506 application"), filed on Apr. 7, 2015, which application is related to and claims priority benefits from U.S. Provisional Application Ser. No. 61/976,056 ("the '056 application"), filed on Apr. 7, 2014, entitled "Sliding Rotating Traytable". The '056 and '056 applications are hereby incorporated in their entireties by this reference.

FIELD OF THE INVENTION

The field of the invention relates to passenger seats or the like, and more particularly to deployable tray tables for use with passenger seats.

BACKGROUND

Many passenger seats, such as those on passenger aircraft, busses, trains, and the like, are designed with deployable tray tables to allow a passenger to rest a drink, meal, computer, or other items during travel. In some instances, the tray table may be stowed in a compartment on one side of the passenger seat that deploys in a horizontal plane.

In some instances, these tray tables may be mounted on linkages, arms, or other motion works that allow for concurrent rotational and translational movement throughout the range of motion of the tray table. Current tray tables that allow for concurrent translation and rotation in the deployed position can be difficult to move because a passenger must not only move the tray table but also stabilize it to prevent unintended rotation. If the tray table rotates or translates into a partially stowed position it may lead to spills or items on the tray table being knocked off the tray table. As a result, a passenger may have difficulty adjusting the tray table for comfort or during ingress and egress from the seat while the tray table is in use.

The present invention provides, among other things, a deployable tray table that may have two distinct regimes of movement. The tray table may have a deployment motion that combines translation and rotation to allow the tray table to pivot and rotate as it moves into and out of a stowage space. The tray table may also have a deployed motion where the tray table is limited to a fore and aft translation without a rotational component to the motion. The restriction of rotational movement may allow a passenger to adjust the tray without the need to stabilize rotational movement. The tray table with a stabilized rotational movement in the deployed position accommodates different passenger seating positions and ingress and egress from the seat while the tray table is deployed with a reduced risk of unintentional motion. In certain embodiments, the separation of deployed adjustment motion and deployment motion may also provide a more natural movement to the passenger. Some embodiments of the present invention may also provide for a simplified, lighter, and more compact motion works and may present opportunities for installation of thinner tray tables.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a passenger seat may comprise a deployable tray table and a tray table stowage space. The deployable tray table may move between a stowed position and a deployed position in a substantially constant plane. One portion of the deployable tray table motion may comprise a linear motion in combination with a rotational motion in the substantially constant plane and a second portion of the deployable tray table motion may comprise only a linear motion in the substantially constant plane.

According to certain embodiments of the present invention, a deployable tray table system may comprise a tray table, a guide track that comprises a curved portion, a transition portion, and a linear portion, a first guide element, and a second guide element. The first guide element may follow the curved portion, transition portion, and linear portion of the guide track and the second guide element may follow only the linear portion of the guide track.

In some embodiments, the transition portion of the guide track may be disposed between the curved portion of the guide track and the linear portion of the guide track.

In certain embodiments, the transition portion of the guide track may comprise an apex of the guide track.

In certain embodiments, the apex may comprise the closest portion of the guide track to a passenger.

In some embodiments, the apex may comprise the furthest portion of the guide track to a passenger.

In certain embodiments, the second guide element may comprise a carriage.

In some embodiments, a pivot may be disposed between the carriage and the tray table.

In some embodiments, the deployable tray table system may include a guide rail may linearly guide the carriage In certain embodiments, the deployable tray table system may include a powered actuator that drives the tray table through a range of motion.

In some embodiments, the tray table may deploy and stow in a substantially constant plane.

In certain embodiments, the tray table may comprise a single-fold tray table.

In some embodiments, the tray table may comprise a multiple-fold tray table.

According to certain embodiments of the present invention, a passenger seat may comprise a deployable tray table, a guide track that comprises a curved portion, a transition portion, and a linear portion, a first guide element, and a second guide element. The first guide element may follow the curved portion, transition portion, and linear portion of the guide track and the second guide element may follow only the linear portion of the guide track.

In some embodiments, the transition portion of the guide track may be disposed between the curved portion of the guide track and the linear portion of the guide track.

In certain embodiments, the transition portion of the guide track may comprise an apex of the guide track.

In some embodiments, the apex may comprise the closest portion of the guide track to a passenger.

In some embodiments, the apex may comprise the furthest portion of the guide track to a passenger.

In certain embodiments, the second guide element may comprise a carriage.

In some embodiments, a pivot may be disposed between the carriage and the deployable tray table.

In certain embodiments, the passenger seat may include at least one guide rail that may linearly guide the carriage.

In some embodiments, the passenger seat may include a powered actuator that drives the deployable tray table through a range of motion.

In certain embodiments, the deployable tray table may comprise a single-fold tray table.

In some embodiments, the deployable tray table may comprise a multiple-fold tray table.

BRIEF DESCRIPTION OF THE DRAWINGS

FIG. 1 is a top plan view of a deployable tray table in a stowed position, according to certain embodiments of the present invention.

FIG. 2 is a top plan view of a deployable tray table during deployment, according to certain embodiments of the present invention.

DETAILED DESCRIPTION

Figure 3:
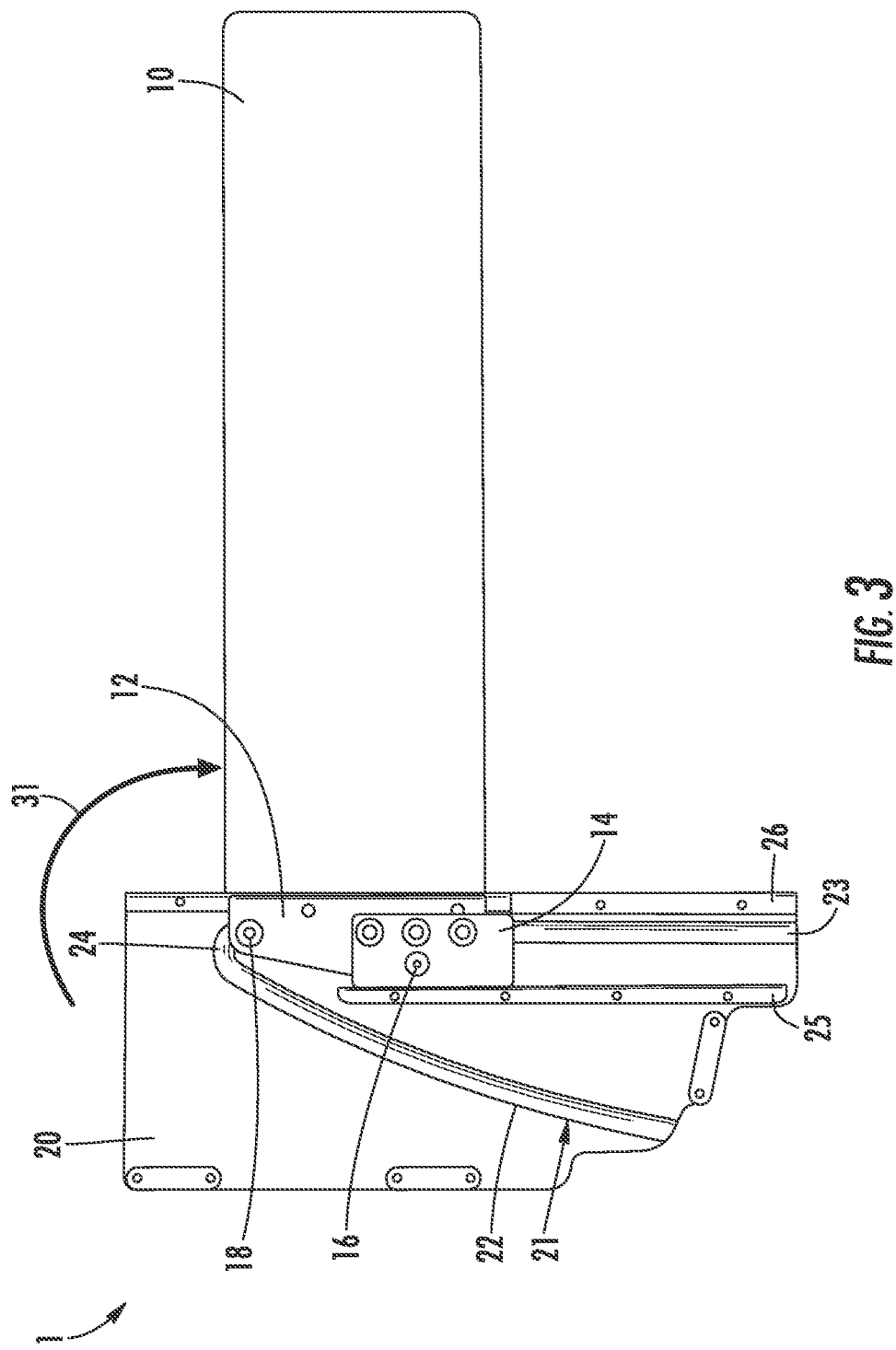
FIG. 3 is a top plan view of a deployable tray table in a forward deployed position, according to certain embodiments of the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide, among other things, a sliding and pivoting deployable tray table for passenger seats. While the tray tables are discussed for use with aircraft seats, they are by no means so limited. Rather, embodiments of the tray table may be used in passenger seats or other seats of any type or otherwise as desired.

In some embodiments of the present invention, as shown in FIGS. 1-4, a tray table assembly 1 may include a tray table 10 and a support plate 20. The tray table 10 may be attached to a guide element 18 and a carriage 14 through a table carrier 12. The table carrier 12 and tray table 10 may rotate about the carriage 14 via a pivot 16. In certain embodiments, the tray table 10 may attach directly to the guide element 18 and carriage 14 without use of a table carrier 12. The support plate 20, which may be an integral part of the larger passenger seat assembly or passenger seat frame (not shown) or a separate part, may comprise a guide track 21. In certain embodiments, the support plate 20 may be attached or integrated into the wall or side of a passenger vehicle, or attached or integrated into any other suitable structure selected for its position and ease of use relative to a passenger.

The guide track 21 or other components of the tray table assembly 1 may be configured to confine the lateral motion of the tray table 10 to a substantially constant plane with respect to the passenger compartment floor. Said differently and by way of example, the guide track 21, guide element 18, carriage 14, or any other components of the tray table assembly 1 may be formed or configured to minimize any lateral movement outside the plane of rotation of the tray table 10. A person of ordinary skill in the art would understand that to maintain motion in a substantially constant plane, the tray table assembly 1 may, in certain embodiments, limit out of plane lateral motion of the tray table 10 to less than approximately ten degrees of variation, and more particularly to less than approximately five degrees of variation, and more particularly to less than approximately one degree of variation. In certain embodiments, the substantially constant plane of motion of the tray table 10 should be horizontal or quasi-horizontal with respect to gravity to securely hold drinks or other items and prevent them sliding during use. For example, in the case of a passenger seat on an aircraft, certain embodiments may place the substantially constant plane of motion of the tray table 10 and the angle of the tray table 10 in its deployed position at positive or negative three degrees relative to the aircraft floor in a longitudinal direction. The longitudinal angle of the substantially constant plane of motion and tray table 10 would compensate for the angle of flight of the aircraft and the orientation direction of the passenger seat to place the tray table 10 at a horizontal or quasi-horizontal longitudinal angle relative to gravity and securely support items on the tray table 10 during flight.

The guide track 21 may generally comprise three sections including a curved portion 22, a linear portion 23, and a transition portion 24. The transition portion 24 of the guide track 21 may be positioned between the curved portion 22 and linear portion 23 of the guide track 21. An outer guide rail 25 and inner guide rail 26 may also be included to direct and/or carry the carriage 14 through its range of motion.

Figure 4:
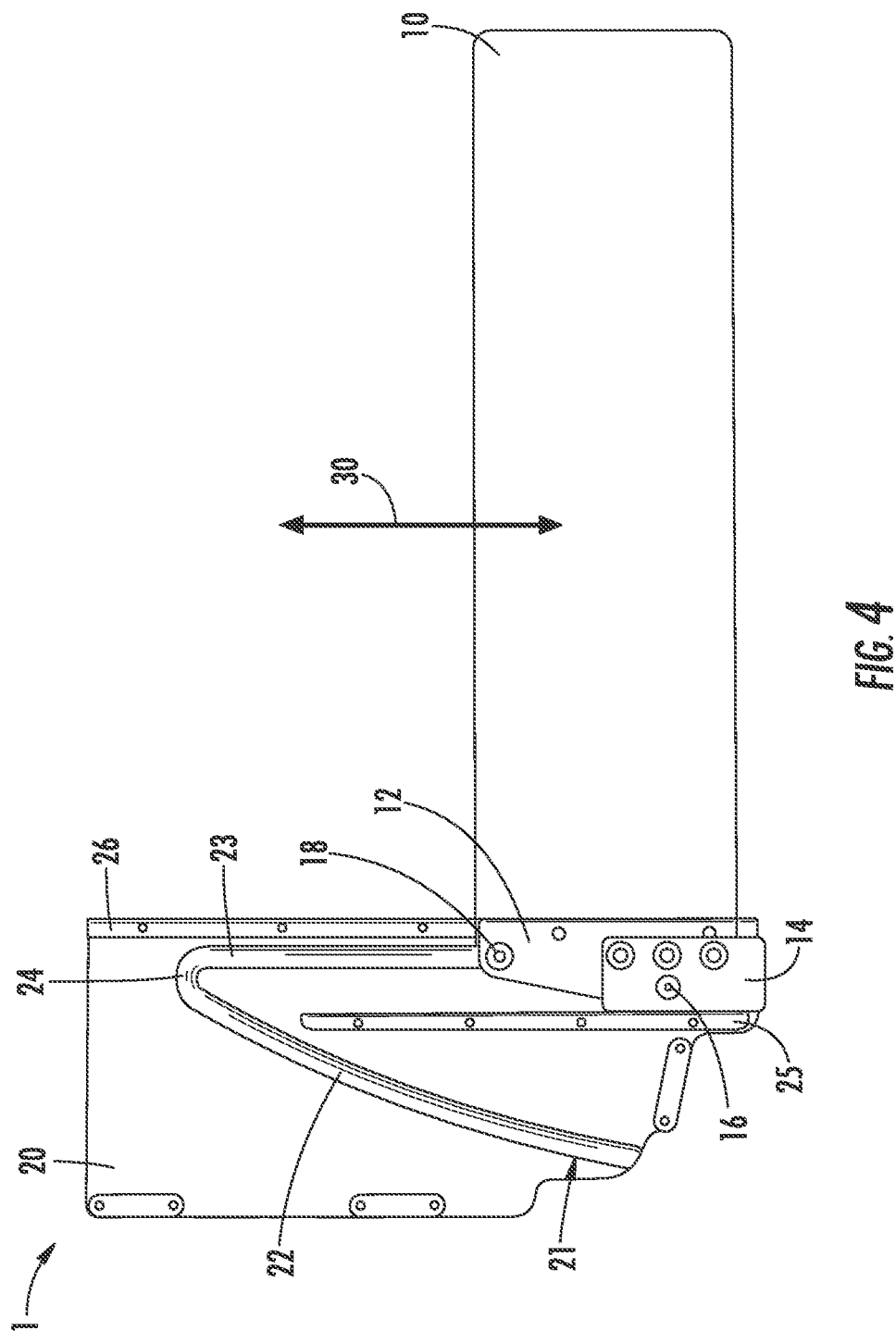
FIG. 4 is a top plan view of a deployable tray table in an aft deployed position, according to certain embodiments of the present invention.

FIGS. 1-4 depict the progression of movement of the tray table 10 from a stowed position (FIG. 1) and a deployed position (FIGS. 3 and 4). In FIG. 1, the tray table 10 is shown in a stowed position. In this position, the tray table 10 may initially move in a fore-aft direction as depicted by the motion arrow 30.

FIG. 2 depicts the tray table 10 in the deployment phase of motion. In the deployment phase of motion, the carriage 14 translates in a fore-aft direction as it moves along outer guide rail 25 and inner guide rail 26. Concurrently, the guide element 18 is translating along the curved portion 22 of the guide track 21. As the carriage 14 and guide element 18 move towards the transition portion 24 of the guide track 21, the distance between the portion of the carriage 14 that engages the guide rails 25, 26 and the portion of guide element 18 that engages the curved portion 22 decreases. As a result, the table carrier 12 and tray table 10 rotate about pivot 16 on carriage 14. The aggregate motion of the tray table 10 is a combination of a fore-aft translation depicted by the motion arrow 30 and a rotation depicted by the motion arrow 31.

FIG. 3 depicts the tray table 10 as it has completed the deployment phase of motion and moved into a deployed position. The guide element 18 has moved around the transition portion 24 of the guide track 21 and entered the linear portion 23 of the guide track 21. The motion of the guide element 18 through the transition portion 24 of the guide track 21 provides the final rotation of the tray table into a deployed position as depicted by the motion arrow 31. The tray table 10 is now in a forward deployed position. The guide element 18 and carriage 14 are now restrained and guided by the linear portion 23 of the guide track 21 and/or the outer guide rail 25 and inner guide rail 26. In this position, the tray table 10 may translate fore and aft but it cannot rotate about pivot 16 unless pushed forward to an extent that guide element 18 re-engages with the transition portion 24 of the guide track 21.

FIG. 4 depicts the tray table 10 in an aft deployed position. The guide element 18 and carriage 14, and thus tray table 10, may move forward or aft as depicted by the motion arrow 30. In the deployed position, the tray table 10 may not rotate or pivot.

Still referring to FIGS. 1-4, a number of alterations or modifications of the above described structures and hardware may be made while still achieving the same functionality. In some embodiments, the guide track 21 may be a channel in the support plate 20 that the guide element 18 fits within. In other embodiments, the guide track 21 may comprise a rail or other projection that the guide element 18 rides along or on. The guide track 21 may be positioned above or below the tray table 10. For example, the tray table 10 and its associated hardware may rest on the guide track 21 or it may hang down from a guide track 21 and support plate 20 located above the tray table 10. In certain embodiments, the tray table assembly 1 may not include the outer guide rail 25, inner guide rail 26, or both. In some embodiments, the carriage 14 may ride on or in the guide track 21 as with the guide element 18. In embodiments without the outer and inner guide rails 25, 26, the carriage 14 and transition portion 24 may be configured to prevent the carriage 14 from passing through the transition portion 24. For example, the radius of curvature of the transition portion 24 may be sufficiently small, or the carriage 14 sufficiently large, such that the carriage 14 may not pass through the transition portion 24 of the guide track 21. In certain embodiments, the guide element 18 and/or carriage 14 may comprise sliders or rolling elements to provide smooth motion through or around the guide track 21 and/or outer and inner guide rails 25, 26. In other embodiments, the carriage 14 may be replaced with a second guide element similar or identical in function to guide element 18.

The guide track 21 may be arranged or configured in any number of ways to provide a specific tray table 10 motion as desired or required by a particular application. In certain embodiments, the transition portion 24 of the guide track 21 may be located between the curved portion 22 and linear portion 23. The transition portion 24 of the guide track 21 may provide several functionalities. In some embodiments, the transition portion 24 of the guide track 21 may comprise an apex to the contour of the guide track 21. Said differently and by way of example, the transition portion 24 of the guide track may comprise the forward-most or aft-most extension of the guide track. The transition portion 24 of the guide track 21 may be contoured to provide a directional change for the guide element 18. During the deployment phase of motion, for example, the guide element 18 may move forward, reach the transition portion 24, and be directed in an aft direction for the deployed phase of motion or vice versa. The transition portion 24 also provides a contour to transition the guide element 18 from the curved portion 22 to the linear portion 23 of the guide track 21. The contour of the transition portion 24 may be configured to adjust the difficulty or ease of moving the tray table from the deployment phase of motion into a deployed position or from a deployed position back into the deployment phase. The radius of curvature of the transition portion 24 may be increased or decreased to alter the amount of force required to move the tray table between different phases of movement. In certain embodiments, the guide track 21 may be reversed such that the curved portion 22 is located closer to the passenger than the linear portion 23, or such that the transition portion 24 is the portion of the guide track 21 is the closest portion of the guide track 21 to a passenger rather than the furthest portion.

The tray table assembly 1 and its associated hardware may be combined with other mechanisms or devices to provide additional functionality or convenience. For example, the tray table assembly 1 may integrate a powered actuator, such as an electric motor, solenoid, or other mechanism to provide automated movement of the tray table 10. It is also possible to integrate a braking mechanism such as a latch or friction lock to hold the tray table 10 in a stowed, deployed, or intermediate position.

Figure 5:
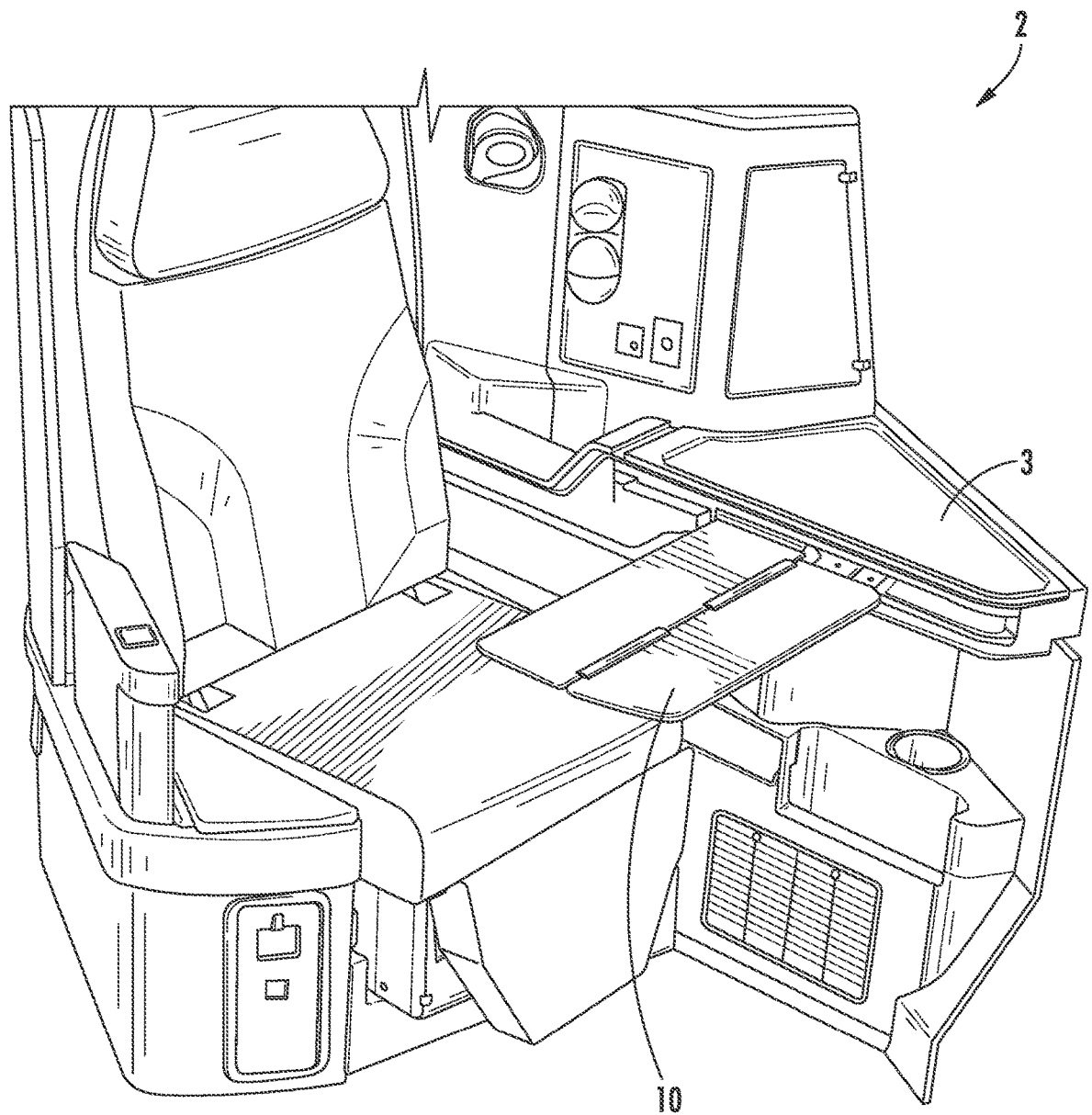
FIG. 5 is a perspective view of a passenger seat with a deployable tray table in a deployed position.
Figure 6:
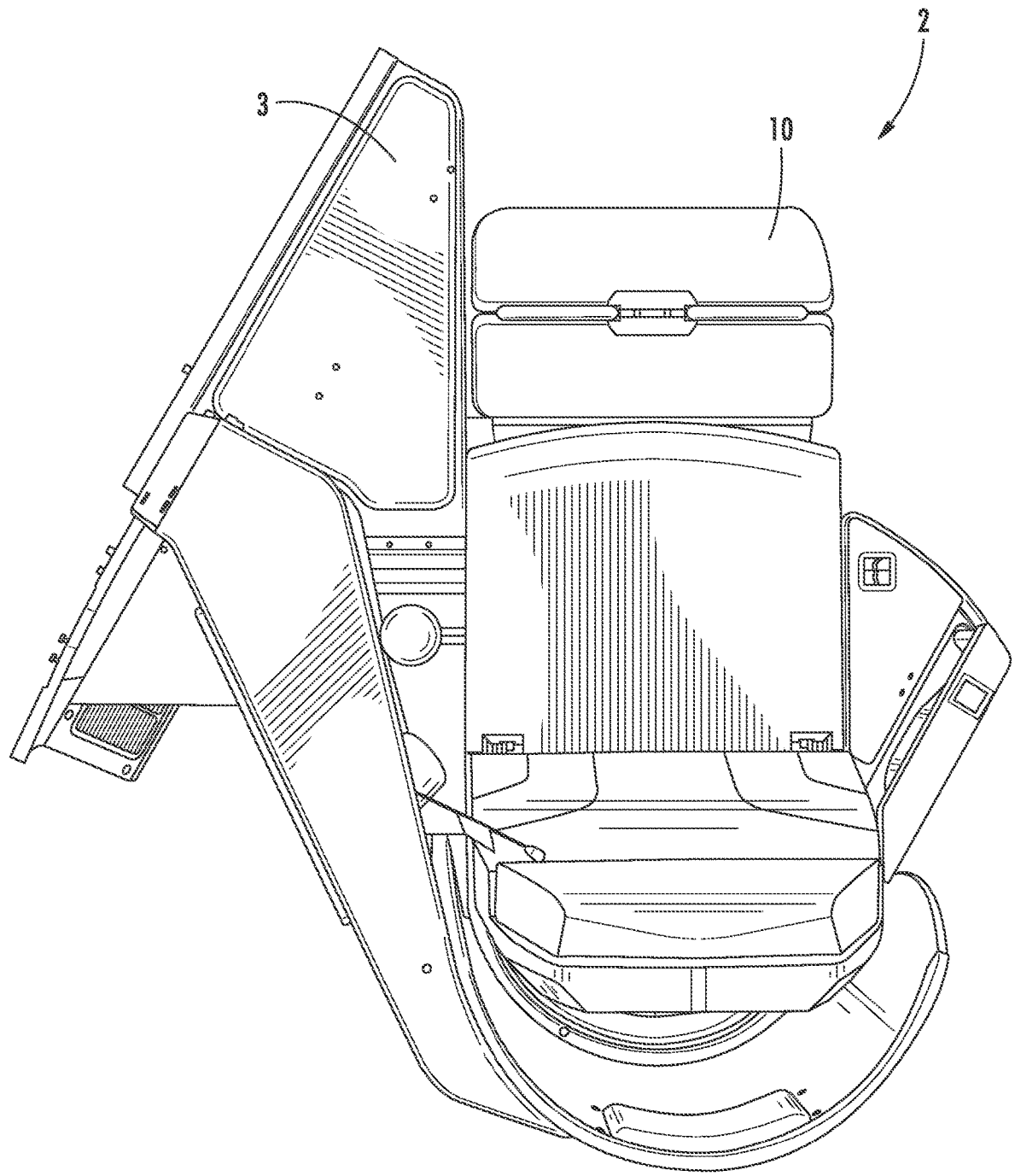
FIG. 6 is a top plan view of a passenger seat with a deployable tray table in a deployed position.

FIGS. 5 and 6 illustrate a passenger seat 2 with an integrated sliding and pivoting tray table 10 in a deployed position. The tray table 10 may be stowed in the console 3, which contains a stowage area (not shown) and space for the motion works and hardware required to control and direct the motion of the tray table 10 from a stowed position to a deployed position. In some embodiments, to provide more efficient stowage and/or offer a larger tray table, the tray table 10 may be of single- or multiple-fold type. As shown in FIGS. 5 and 6, the tray table 10 is a single-fold type tray table and may be folded in half to allow a larger tray table 10 to be stored in the console 3.

Any of the above described components, parts, or embodiments may take on a range of shapes, sizes, or materials as necessary for a particular application of the described invention. The components, parts, or mechanisms of the described invention may be made of any materials selected for the suitability in use, cost, or ease of manufacturing. Materials including, but not limited to aluminum, stainless steel, fiber reinforced plastics, composites, polycarbonate, polypropylene, other metallic materials, or other polymers may be used to form any of the above described components.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A passenger seat comprising:
   a deployable tray table;

a tray table stowage space, wherein:
the deployable tray table moves through a motion path between a stowed position and a deployed position in a substantially constant plane;
a first portion of the motion path comprises linear motion in combination with rotational motion in the substantially constant plane;
a second portion of the motion path comprises only linear motion in the substantially constant plane; and
the tray table stowage space comprises a slot such that, when the deployable tray table is in the stowed position, the deployable tray table is stored in the substantially constant plane in the slot within a console of the passenger seat.

2. The passenger seat of claim 1, wherein the deployable tray table remains in the substantially constant plane through a full range of motion between the stowed and deployed positions.

3. The passenger seat of claim 1, wherein a thickness of the slot is approximately equal to a thickness of the deployable tray table.

4. The passenger seat of claim 1, wherein the substantially constant plane is horizontal.

5. The passenger seat of claim 1, wherein the first portion of the motion path and the second portion of the motion path are approximately equal in length in a forward/aft direction.

6. A deployable tray table system comprising:
a tray table;
a guide track comprising a curved portion, a transition portion, and a linear portion;
a first guide element; and
a second guide element, wherein:
the first guide element follows the curved portion, the transition portion, and the linear portion of the guide track;
the second guide element follows only the linear portion of the guide track; and
the transition portion includes an end of the curved portion and an end of the linear portion, wherein the first guide element moves through the transition portion when moving between the curved portion and the linear portion.

7. The deployable tray table system of claim 6, wherein movement of the first guide element between the curved portion of the guide track and the linear portion of the guide track causes the tray table to rotate such that a table surface of the tray table remains in an approximately horizontal plane during movement caused by the first and second guide elements.

8. The deployable tray table system of claim 6, wherein the curved portion and the linear portion are approximately equal in length in a forward/aft direction.

9. The deployable tray table system of claim 6, wherein the second guide element comprises a carriage.

10. The deployable tray table system of claim 9 further comprising a pivot connecting the carriage and the tray table.

11. The deployable tray table system of claim 9 further comprising at least one guide rail extending in a direction that is approximately parallel with the linear portion;
wherein the at least one guide rail linearly guides the carriage.

12. The deployable tray table system of claim 6 further comprising a powered actuator;
wherein the powered actuator drives the tray table through a range of motion.

13. The deployable tray table system of claim 6 wherein the tray table deploys and stows in a substantially constant plane.

14. The deployable tray table system of claim 6, wherein the tray table comprises a single-fold tray table.

15. The deployable tray table system of claim 6, wherein the tray table comprises a multiple-fold tray table.

16. A passenger seat comprising:
a deployable tray table;
a guide track comprising a curved portion, a transition portion, and a linear portion;
a first guide element; and
a second guide element, wherein:
the first guide element follows the curved portion, the transition portion, and the linear portion of the guide track;
the second guide element follows only the linear portion of the guide track; and
movement of the first guide element between the curved portion of the guide track and the linear portion of the guide track causes the deployable tray table to rotate such that a table surface of the deployable tray table remains in an approximately horizontal plane.

17. The passenger seat of claim 16, wherein the transition portion of the guide track includes an end of the curved portion and an end of the linear portion, wherein the first guide element moves through the transition portion when moving between the curved portion and the linear portion.

18. The passenger seat of claim 16, wherein the curved portion and the linear portion are approximately equal in length in a forward/aft direction.

19. The passenger seat of claim 16, wherein the second guide element comprises a carriage.

20. The passenger seat of claim 19 further comprising a pivot connecting the carriage and the deployable tray table.

21. The passenger seat of claim 19 further comprising at least one guide rail extending in a direction that is approximately parallel with the linear portion;
wherein the at least one guide rail linearly guides the carriage.

22. The passenger seat of claim 16 further comprising a powered actuator;
wherein the powered actuator drives the deployable tray table through a range of motion.

23. The passenger seat of claim 16, wherein the deployable tray table comprises a single-fold tray table.

24. The passenger seat of claim 16, wherein the deployable tray table comprises a multiple-fold tray table.

\* \* \* \* \*